(12) United States Patent
Park et al.

(10) Patent No.: US 8,765,081 B2
(45) Date of Patent: Jul. 1, 2014

(54) MICRO-CHANNEL REACTOR FOR PRODUCING SYNTHETIC NATURAL GAS

(75) Inventors: Jong Soo Park, Daejeon (KR); Shin Kun Ryi, Daejeon (KR); Kyung Ran Hwang, Daejeon (KR); Dong Kook Kim, Daejeon (KR); Tae Hwan Kim, Daejeon (KR); Chun Boo Lee, Daejeon (KR); Sung Wook Lee, Daejeon (KR)

(73) Assignee: Korea Institute of Energy Research (KR)

( * ) Notice: Subject to any disclaimer, the term of this patent is extended or adjusted under 35 U.S.C. 154(b) by 0 days.

(21) Appl. No.: 13/812,924

(22) PCT Filed: Jul. 26, 2011

(86) PCT No.: PCT/KR2011/005506
§ 371 (c)(1),
(2), (4) Date: Jan. 29, 2013

(87) PCT Pub. No.: WO2012/015223
PCT Pub. Date: Feb. 2, 2012

(65) Prior Publication Data
US 2013/0129584 A1    May 23, 2013

(30) Foreign Application Priority Data
Jul. 30, 2010 (KR) .................. 10-2010-0073794

(51) Int. Cl.
*B01J 19/00* (2006.01)
*B01J 23/755* (2006.01)
*C10L 3/08* (2006.01)
*B01J 37/00* (2006.01)

(52) U.S. Cl.
CPC .... *B01J 19/0093* (2013.01); *B01J 2219/00783* (2013.01); *B01J 2219/00835* (2013.01); *B01J 23/755* (2013.01); *B01J 2219/00873* (2013.01); *C10L 3/08* (2013.01); *B01J 37/0009* (2013.01); *B01J 2219/00824* (2013.01); *B01J 2219/00844* (2013.01); *B01J 2219/00822* (2013.01)
USPC ............ 422/602; 422/603; 422/200; 422/198; 422/129

(58) Field of Classification Search
USPC .......... 422/130, 602, 603; 429/452, 455–461, 429/480, 514, 512, 517–522
See application file for complete search history.

(56) References Cited

U.S. PATENT DOCUMENTS

| | | | |
|---|---|---|---|
| 5,015,444 A * | 5/1991 | Koga et al. ................. | 422/625 |
| 2004/0220434 A1 | 11/2004 | Brophy et al. | |
| 2005/0176832 A1 | 8/2005 | Tonkovich et al. | |
| 2006/0245987 A1 * | 11/2006 | Schmidt ..................... | 422/198 |
| 2007/0004810 A1 | 1/2007 | Wang et al. | |
| 2009/0311150 A1 * | 12/2009 | Cho et al. .................. | 422/190 |
| 2010/0160463 A1 | 6/2010 | Wang et al. | |

OTHER PUBLICATIONS

S.K. Ryi, J.S. Park, D.K. Kim, S.H. Kim, Methane steam reforming with a novel catalytic membrane for effective hydrogen production, Journal of Membrane Science, 339 (2009) p. 189-194.*

* cited by examiner

Primary Examiner — Jill Warden
Assistant Examiner — Benjamin Whatley
(74) Attorney, Agent, or Firm — Cantor Colburn LLP

(57) ABSTRACT

The present invention relates to a micro-channel reactor for producing synthetic natural gas, and more particularly, to a micro-channel reactor for producing synthetic natural gas containing methane gas from synthetic gas, including a porous nickel plate catalyst part.

8 Claims, 3 Drawing Sheets

MICRO-CHANNEL REACTOR FOR PRODUCING SYNTHETIC NATURAL GAS

TECHNICAL FIELD

The present invention relates to a micro-channel reactor for synthesizing methane, and more particularly, to a micro-channel reactor for producing synthetic natural gas containing methane gas from synthetic gas, including a porous nickel plate catalyst part.

BACKGROUND ART

In order to solve a price increase of crude oil and natural gas and a global warming problem caused by the use of fossil fuel, an effort for deviating from dependence on the existing fossil fuel has recently been actively conducted. However, the fossil fuel is occupying a substantial portion of energy consumed all over the world up to now, and an energy consumption structure in which the fossil fuel is mainly used is expected to continue for the present.

Coal has a reserve life of two hundred years or more, which is longest among those of current fossil fuels, has a relatively cheap cost per heat amount, and may be mined at various regions. Due to the above-mentioned advantages, research into various methods of obtaining natural gas from the coal has been conducted.

The natural gas obtained from the coal has been called methane or substitute natural gas (hereinafter, referred to as synthetic natural gas) and has been expressed as synthetic or substitute natural gas (SNG). As a method of obtaining the SNG from the coal, there are a method of obtaining the SNG through a methane synthetic reaction using synthetic gas obtained through gasification of the coal as a catalyst (a gasification method), a method of obtaining the SNG by allowing the coal to react directly to hydrogen (a hydrogasification method), and a method of obtaining the SNG by allowing the coal to react to vapor at a low temperature using a catalyst (a catalytic gasification method). The method of producing the SNG based on the gasification in which the SNG is synthesized from the synthetic gas (having CO and $H_2$ as main components) obtained by performing gasification of the coal ($CO+3H_2 \rightarrow CH_4+H_2O$) is classified into an indirect method, and the hydrogasification method in which the SNG is obtained by allowing carbon within the coal to directly react to hydrogen supplied from the outside ($C+2H_2 \rightarrow CH_4$) and the catalytic gasification method in which the SGN is obtained by allowing carbon within the coal to react to vapor ($2C+2H_2O \rightarrow CH_4+CO_2$) are classified into a direct method.

Describing the method of producing the SNG from the synthetic gas obtained through the gasification of the coal (the indirect method) among the above-mentioned methods, a process of producing the SNG from the coal is mainly divided into a synthetic gas producing process (a process of producing the synthetic gas having CO and $H_2$ as the main components from the coal) and a process of synthesizing the SNG using a catalyst (a process of synthesizing the SNG from the synthetic gas having CO and $H_2$ as the main components), wherein the synthetic gas producing process is configured to be significantly similar to a gasification process and a synthetic gas purification process in an integrated gasification combined cycle (IGCC) process. However, since a ratio of $H_2$ to CO within the synthetic gas discharged during gasification of the coal is 1.0 or less, a water gas conversion process ($CO+H_2O \rightarrow H_2+CO_2$) of increasing a concentration so that the ratio of $H_2$ to CO becomes about 3.0 is required, and a purification process having a higher degree than that of the purification process in the existing IGCC due to characteristics of the SNG requiring a $H_2S$ concentration at a ppb level within the synthetic gas is required.

Meanwhile, the synthetic gas subjected to the water gas conversion process and the synthetic gas purification process may be converted into methane under a catalyst having Ni supported on a ceramic support as a main component. Since the methanation reaction ($3H_2+CO \rightarrow CH_4+H_2O$) is a very strong exothermic reaction (having reaction heat of 206.1 kJ/mol), in the case of using the catalyst produced using the ceramic support having low thermal conductivity, catalyst activity is deteriorated due to sintering, or the like, caused by an increase in catalyst temperature. Design of a methanation reactor capable of easily performing heat control may be the most important core technology.

As a method used in order to prevent a rapid increase in temperature in this reaction process, methods such as a gas recycling method of recycling a portion of reduced gas toward an introduction side of a methanation reactor, a gas distributing method of distributing synthetic gas introduced into a methanation reactor, and a reactor serial connection method of preventing an increase in temperature due to a rapid reaction in a single reactor by sequentially connecting several reactors in series with each other, or the like, have been attempted. However, in a reactor design technology for efficiently controlling reaction heat in a methanation reaction, continuous improvement or introduction of a new technology has been demanded even up to now.

DISCLOSURE

Technical Problem

An embodiment of the present invention is directed to providing a reactor for producing synthetic natural gas containing methane gas from synthetic gas, including a porous nickel plate catalyst part in order to more efficiently control reaction heat in producing the synthetic natural gas having the methane as a main component using the synthetic gas as a raw material.

In addition, another embodiment of the present invention is directed to providing a micro-channel reactor for synthesizing methane in which a porous nickel plate is used as a reaction catalyst for methanation reaction of synthetic gas and heat exchanger are provided on upper and lower portions of the porous nickel layer.

The micro-channel reactor for synthesizing methane includes gas distributors between the heat exchangers and the porous nickel plate, respectively, thereby making it possible to further facilitate heat transfer and diffusion of gas to a catalyst part.

Another embodiment of the present invention is directed to providing a method for producing synthetic natural gas using synthetic gas as a raw material through the reactor.

Technical Solution

In one general aspect, a reactor for producing synthetic natural gas containing methane gas from synthetic gas includes a porous nickel plate catalyst part in order to more efficiently control reaction heat in producing the synthetic natural gas having the methane as a main component using the synthetic gas as a raw material.

The reactor for producing synthetic natural gas according to the present invention may produce synthetic natural gas only using a porous nickel plate catalyst part. The porous nickel plate has excellent thermal conductivity, thereby making it possible to minimize heat generation within the reactor.

In another general aspect, a micro-channel reactor for producing synthetic natural gas containing methane gas from synthetic gas for methanation reaction of the synthetic gas includes: an upper plate including a reactant introduction pipe and a cooling fluid discharge pipe formed at different positions on an upper surface thereof, the reactant introduction pipe introducing synthetic gas containing hydrogen and carbon monoxide therethrough; a lower plate including a cooling fluid introduction pipe and a product discharge pipe formed at different positions on a lower surface thereof, the product discharge pipe discharging a product containing methane gas produced after reaction therethrough; upper and lower heat exchangers each provided between the upper and lower plates and each including a reactant introduction through-hole, a cooling fluid discharge through-hole, a product discharge through-hole, and a cooling fluid introduction through-hole formed at each corner thereof, and a micro-channel; and a porous nickel plate catalyst part provided between the upper and lower heat exchangers, including a cooling fluid discharge through-hole and a cooling fluid introduction through-hole, and including a porous nickel plate.

Each of the reactant introduction pipe and the cooling fluid discharge pipe included in the upper plate and the cooling fluid introduction pipe and the product discharge pipe included in the lower plate may be formed at a position corresponding to that of each of the through-holes included in the heat exchangers, the cooling fluid discharge through-hole and the cooling fluid introduction through-hole included in the porous nickel plate catalyst part may be formed at positions corresponding to those of the cooling fluid discharge pipe and the cooling fluid introduction pipe, and the heat exchangers may be configured so that each of the through-holes thereof corresponding to the cooling fluid introduction pipe and cooling fluid discharge pipe is connected to the micro-channel by a connection pipe.

The micro-channel reactor may further include an upper gas distributor provided between the upper heat exchanger and the porous nickel plate catalyst part and including a reactant introduction through-hole, a cooling fluid discharge through-hole, a product discharge through-hole, a cooling fluid introduction through-hole, and a porous-channel, the reactant introduction through-hole being connected to the porous-channel by a connection pipe; and a lower gas distributor provided between the lower heat exchanger and the porous nickel plate catalyst part and including a reactant introduction through-hole, a cooling fluid discharge through-hole, a product discharge through-hole, a cooling fluid introduction through-hole, and a porous-channel, the product discharge through-hole being connected to the porous-channel by a connection pipe.

Advantageous Effects

The micro-channel reactor for producing synthetic natural gas containing methane gas from synthetic gas including the porous nickel plate catalyst part according to the present invention has excellent heat transfer efficiency, thereby making it possible to minimize activity deterioration of methanation reaction due to heat generation reaction within the reactor.

In addition, reaction heat of the porous nickel plate catalyst part may be further easily controlled through the gas distributor and the heat exchanger, such that the porous nickel plate catalyst part may be used in the reactor for producing synthetic natural gas containing methane gas from synthetic gas.

In addition, according to the present invention, the reaction gas is uniformly distributed over the inside of the reactor, thereby making it possible to uniformize a reaction region and efficiently control the reaction heat by the heat exchanger. Therefore, the micro-channel reactor according to the present invention may be easily used in a commercialization process for producing natural gas from synthetic gas.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

Figure 1:
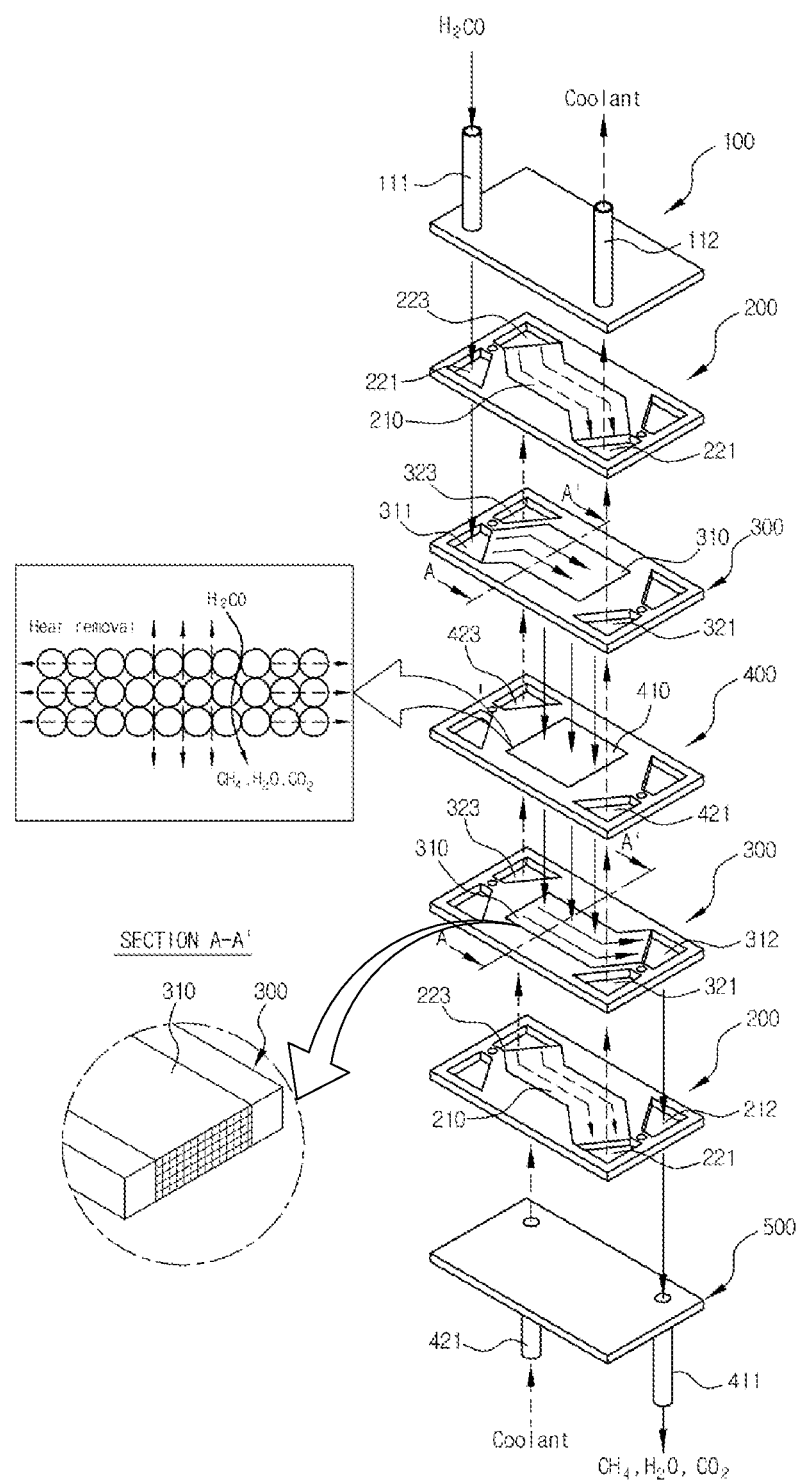
FIG. 1 is an enlarged view of a porous nickel plate of a micro-channel reactor according to the present invention and an exploded perspective view of each component of a micro-channel reactor according to the present invention.

1: HYDROGEN SUPPLY SOURCE
2: CARBON MONOXIDE SUPPLY SOURCE
3: MFC
4: HEATER
5: REACTOR
6: THERMOMETER (THERMOCOUPLE)
7: WATER COOLING COOLER
8: CONTROL AND MONITORING DEVICE
100: UPPER PLATE
111: REACTANT INTRODUCTION PIPE
112: COOLING FLUID DISCHARGE PIPE
200: HEAT EXCHANGER
210: MICRO-CHANNEL
211: REACTANT INTRODUCTION THROUGH-HOLE
212: PRODUCT DISCHARGE THROUGH-HOLE
221: COOLING FLUID DISCHARGE THROUGH-HOLE
223: COOLING FLUID INTRODUCTION THROUGH-HOLE
300: GAS DISTRIBUTOR
310: POROUS CHANNEL
311: REACTANT INTRODUCTION THROUGH-HOLE
312: PRODUCT DISCHARGE THROUGH-HOLE
321: COOLING FLUID DISCHARGE THROUGH-HOLE
323: COOLING FLUID INTRODUCTION THROUGH-HOLE
400: POROUS NICKEL PLATE CATALYST PART
410: POROUS NICKEL PLATE
421: COOLING FLUID DISCHARGE THROUGH-HOLE
423: COOLING FLUID INTRODUCTION THROUGH-HOLE
500: LOWER PLATE
511: PRODUCT DISCHARGE PIPE
521: COOLING FLUID INTRODUCTION PIPE

Best Mode

A configuration of the present invention will be described in detail.

A porous nickel plate catalyst according to the present invention may be produced by compressing a nickel powder having a size of 0.1 μm to 50 μm by a press or be produced by mixing the nickel powder with a binder and then performing heat treatment. In addition, the porous nickel plate catalyst according to the present invention may be produced by coating a catalyst on a metal mesh. A size of the porous nickel plate is not limited, but may be determined according to capacity of a reactor and may be 50 to 99% of a cross-sectional area of the reactor. In addition, the porous nickel plate may have various shapes such as a circular shape, a rectangular shape, a square shape, or the like.

In the case of using the porous nickel plate catalyst, in order to improve durability of the catalyst, the catalyst may be produced by coating ceramics on a surface of a nickel powder or mixing ceramics. The ceramic may be selected from a metal oxide containing at least one or two metal selected from a group consisting of Al, Si, Ti, V, Zr, and Ce and be 0.1 to 3 wt % based on nickel.

In producing synthetic natural gas having methane as a main component using synthetic gas as a raw material, the porous nickel plate catalyst is used singly, thereby making it possible to produce the synthetic natural gas. The porous nickel plate has excellent heat transfer efficiency, thereby making it possible to minimize heat generation within the reactor.

In addition, according to the present invention, the reactor may be configured to include the porous nickel plate catalyst part, heat exchangers, and upper and lower plates.

Each of the upper and lower plates according to the present invention is configured as described below.

The upper plate includes a reactant introduction pipe and a cooling fluid discharge pipe formed at different positions on an upper surface thereof, the reactant introduction pipe introducing a reactant therethrough, and the lower plate includes a cooling fluid introduction pipe and a product discharge pipe formed at different positions on a lower surface thereof, the product discharge pipe discharging a product after reaction therethrough.

The cooling fluid is introduced from a cooling fluid introduction pipe of the lower plate in an opposite direction to a direction in which the reactant is introduced, that is, an opposite direction to a direction in which the reactant moves from the reactant introduction pipe to the product discharge pipe through the porous nickel plate, and is discharged through the cooling fluid discharge pipe of the upper plate on which the reactant introduction pipe is formed.

The cooling fluid may be preferably liquid or gas, and more preferably, liquid such as water, alcohol, or the like, and may be variously selected according to a process condition.

A material of the upper and lower plates may be preferably a metal or a ceramic, and more preferably, a metal coated with a ceramic that has excellent heat transfer efficiency and is capable of preventing a thermal damage of the upper and lower plates capable of occurring at the time of operation at a high temperature.

The heat exchangers will be described in detail. As shown in FIG. 1, the heat exchangers 200 allow the cooling fluid to pass through a space between the upper plate 100 and the porous nickel plate catalyst part 400 or a space between the lower plate 500 and the porous nickel plate catalyst part 400, thereby making it possible to cool the porous nickel plate 410 that has become hot due to reaction heat generated by methanation reaction.

When the reactor includes gas distributors 300, the heat exchangers 200 allow the cooling fluid to pass through a space between the upper plate 100 and the upper gas distributor 300 and a space between the lower plate 500 and the lower gas distributor 300, thereby making it possible to cool the porous nickel plate 410 and the gas distributors 300 that has become hot due to the reaction heat generated by the methanation reaction.

As shown in FIG. 1, the upper heat exchanger 200 includes through-holes, that is, a reactant introduction through-hole 211, a cooling fluid introduction through-hole 223, a cooling fluid discharge through-hole 221, and a micro-channel 210 between the cooling fluid introduction through-hole 223 and the cooling fluid discharge through-hole 221. The lower heat exchanger 200 includes a product discharge through-hole 212, a cooling fluid introduction through-hole 223, a cooling fluid discharge through-hole 221, and a micro-channel 210 between the cooling fluid introduction through-hole 223 and the cooling fluid discharge through-hole 221. Each of the through-holes through which the reactant and the cooling fluid are introduced or the product and the cooling fluid are discharged are formed corresponding to positions of the reactant introduction pipe 111, the cooling fluid introduction pipe 421, the product discharge pipe 411, and the cooling fluid discharge pipe 112, that are attached to the upper or lower plate. In the heat exchangers 200, each of the through-holes corresponding to the positions of the cooling fluid introduction pipe 421 and the cooling fluid discharge pipe 112 is connected to the micro-channel 210, thereby making it possible to allow the cooling fluid to move to the spaces between the upper and lower plates and the heat exchangers.

A material of the heat exchanger may be preferably a metal or a ceramic, and more preferably, a metal coated with a ceramic that has excellent heat transfer efficiency and is capable of preventing a thermal damage of the heat exchanger capable of occurring at the time of operation at a high temperature.

The micro-channel 210 is formed to have a wide surface area in order to allow the cooling fluid to efficiently cool reaction gas (or product gas) passing through the gas distributors 300 and the porous nickel plate catalyst part 400.

The micro-channel 210 may be formed by processing a metal or ceramic thin plate through various processes such as an etching process, a laser processing process, a press process, or the like.

The micro-channel 210 may be more preferably formed through an etching process and have a width of 100 μm to 1000 μm and a depth of 100 μm to 1000 μm.

Meanwhile, the gas distributors 300 according to the present invention will be described in detail.

The gas distributors 300 are formed of a straight or curved porous channel having a width of 100 μm to 1000 μm and a depth of 100 μm to 1000 μm, and more preferably, a three-dimensional (3D) channel in order to increase a contact area between the gas distributor and the porous nickel separation layer and between the gas distributor and the heat exchanger and easily mix the reactant. The 3D channel may be formed to have a mesh shape and have a lattice structure having a width of 100 μm to 1000 μm and a depth of 100 μm to 1000 μm.

Each of the gas distributors 300 includes through-holes, that is, a reactant introduction through-hole 311, a cooling fluid discharge through-hole 321, a product discharge through-hole 312, and a cooling fluid introduction through-hole 323, formed at each corner thereof and having the reactant and the cooling fluid introduced therethrough or the product and the cooling fluid are discharged therethrough, and a porous channel 310, as shown in FIG. 1. Each of the through-holes through which the reactant and the cooling fluid are introduced or the product and the cooling fluid are discharged may be formed corresponding to positions of the reactant introduction pipe 111, the cooling fluid introduction pipe 521, the product discharge pipe 511, and the cooling fluid discharge pipe 112, that are attached to the upper plate 100 or the lower plate 500, and may also be formed at positions corresponding to the through-holes (the reactant introduction through-hole 211, the cooling fluid introduction through-hole 223, the product discharge through-hole 212, and the cooling fluid discharge through-hole 221) that are formed in the heat exchangers 200 and have the reactant and the cooling fluid introduced therethrough or the product and the cooling fluid discharged therethrough.

The through-hole of the upper gas distributor 300 corresponding to the reactant introduction pipe is connected to the porous channel 310, thereby making it possible to allow synthetic gas introduced from the reactant introduction pipe 111 of the upper plate 100 to pass through the reactant introduction through-hole 211 of upper the heat exchanger 200, pass through the upper gas distributor 300, and then be uniformly introduced into the porous nickel plate catalyst part.

In addition, the through-hole of the lower gas distributor 300 corresponding to the product discharge pipe is connected to the porous channel 310, thereby making it possible to allow the product passing through the porous nickel plate catalyst part to be uniformly collected through the lower gas distributor 300, pass through the lower heat exchanger 200, and then be discharged to the lower plate 500 via the product discharge through-hole 312 of the lower gas distributor 300 and the product discharge through-hole 212 of the lower heat exchanger 200.

Meanwhile, a porous channel 310 of the gas distributor may be made of a porous material capable of passing the reaction gas and the product gas therethrough and needs to ensure durability so that operation may be performed at a high temperature and a high pressure for a long time. A material of the gas distributor may be preferably a metal or a ceramic, and more preferably, a metal coated with a ceramic that has excellent heat transfer efficiency and is capable of maintaining durability at a high temperature. Here, it is appropriate that a ceramic coating layer has a thickness of 0.01 to 10 μm. When the ceramic coating layer has a thickness smaller than 0.01 μm, durability is weak, and when the ceramic coating layer has a thickness larger than 10 μm, it becomes excessively hot, such that it has deteriorated heat transfer efficiency or is delaminated.

Further, as the porous channel, a porous nickel plate capable of being used as a methanation reaction catalyst in the present invention may be used instead of a porous metal plate or metal mesh. In this case, a nickel catalyst layer component is additionally formed in the reactor, such that it is further necessary to efficiently remove the reaction heat within the reactor.

According to the present invention, the methanation reaction may be performed only by the upper and lower plates, the heat exchangers, and the porous nickel plate catalyst part, without using the gas distributors, according to a reaction process condition.

Meanwhile, the porous nickel plate catalyst part according to the present invention will be described in detail.

The porous nickel plate catalyst part 400 according to the present invention includes through-holes, that is, a cooling fluid discharge through-hole 421 and a cooling fluid introduction through-hole 423 formed at each corner thereof and having the cooling fluid introduced or discharged therethrough, and a porous nickel plate 410, as shown in FIG. 1. The through-holes are formed at positions corresponding to the cooling fluid introduction pipe 421 and the cooling fluid discharge pipe 112 attached to the upper and lower plate and the cooling fluid discharge through-hole 221 and the cooling fluid introduction through-hole 223 among the through-holes formed in the heat exchangers, and are formed at positions corresponding to the cooling fluid discharge through-hole 321 and the cooling fluid introduction through-hole 323 among the through-holes formed in the gas distributors.

As shown in FIG. 1 and explained above, the cooling fluid is introduced to the cooling fluid introduction pipe 521 in the lower plate 500 and exits the cooling fluid discharge pipe 112 in the upper plate 100. More specifically, the cooling fluid partially passes through the through-hole 223, the micro-channel 210 and the through-hole 221 in the lower heat exchanger, and then the through-holes 321 in the lower gas distributor 300, the through-hole 421 in the porous nickel plate catalyst part 400, the through-hole 321 in the upper gas distributor 300, and the through-hole 221 in the upper heat exchanger. Further, part the cooling fluid passes through the through-holes 223, 323, 423 up to the upper heat exchanger 200, and then passes the micro-channel 210 in the upper heat exchanger 200. In FIG. 1, the dot-line arrows indicate the flow-passageway of the cooling fluid, and the solid-line arrows indicate the flow-passageway of the reactant and product.

According to the present invention, as the catalyst converting the synthetic gas into the natural gas by the methanation reaction, the porous nickel plate catalyst, which may be produced by compressing the nickel powder by the press, is used.

The nickel powder may preferably have a size of 0.1 μm to 50 μm, and the size of the porous nickel plate obtained from the nickel powder is not limited, but may be determined according to the capacity of the reactor and may be 50 to 99% of a cross-sectional area of the reactor. In addition, the porous nickel plate may have various shapes such as a circular shape, a rectangular shape, a square shape, or the like.

In the case of using the porous nickel plate catalyst, in order to improve durability of the catalyst, the catalyst may be produced by coating ceramics on the surface of the nickel powder or mixing ceramics.

There are no limitations in a thickness, the upper and lower plates, the heat exchanger, the gas distributor, and the porous nickel plate catalyst part. However, in the case of the heat exchanger and the gas distributor, in order to secure a large specific surface area in the same volume, a thickness of a plate needs to be determined in consideration of a width and a depth of the micro-channel and the porous channel.

Here, each plate may be brazing-bonded, diffusion-bonded, or bolt-connected to each other.

Particularly, when the reactor for methanation reaction according to the present invention is manufactured by installing the upper and lower plates, the heat exchanger, the gas distributor, and the porous nickel plate catalyst part, the reactant introduction pipe, the reactant discharge pipe, the cooling fluid introduction pipe, and the cooling fluid discharge pipe of the upper and lower plates need to be installed at positions corresponding to each of the through-holes formed in the heat exchangers, the gas distributors, and the porous nickel plate catalyst part installed so as to contact each other under the upper and lower plates.

Therefore, the cooling fluid discharge pipe of the upper plate and each of the through-holes formed in the heat exchanger, the gas distributor, and the porous nickel plate catalyst part and corresponding to the cooling fluid discharge pipe form a long space capable of being connected as a path of the cooling fluid, and the cooling fluid introduction pipe of the lower plate and each of the through-holes formed in the heat exchanger, the gas distributor, and the porous nickel plate catalyst part and corresponding to the cooling fluid introduction pipe also form a long space capable of being connected as a path of the cooling fluid, such that the cooling fluid may be freely moved.

In addition, the reactant introduction pipe of the upper plate and each of the through-holes formed in the upper heat exchanger and the upper gas distributor and corresponding to the reactant introduction pipe form a space capable of being connected as a path of a fluid, and the through-holes of the upper gas distributor corresponding to the reactant introduction pipe is connected to the porous channel, thereby making it possible to allow the synthetic gas introduced from the reactant introduction pipe of the upper plate to pass through the reactant introduction through-hole of the heat exchanger, pass through the gas distributor, and then be uniformly introduced into the porous nickel plate catalyst part.

In addition, the product discharge pipe of the lower plate and each of the through-holes formed in the lower heat exchanger and the gas distributor and corresponding to the product discharge pipe form a space capable of being connected as a path of a fluid, thereby making it possible to allow the fluid to freely move.

In addition, the through-hole of the lower gas distributor corresponding to the product discharge pipe is connected to the porous channel, thereby making it possible to allow the product passing through the porous nickel plate catalyst part to be uniformly collected through the lower gas distributor, pass through the lower heat exchanger, and then be discharged to the lower plate.

Since the upper and lower plates, the heat exchangers, the gas distributors, and the porous nickel plate catalyst part contact each other in order to prevent leakage of gas to the outside, contact surfaces therebetween need to be significantly finely processed and a stacked side part of them is preferably sealed by a sealant.

Describing the flow of the cooling fluid according to the present invention in the case in which there is the gas distributor by way of example, the cooling fluid is introduced through the cooling fluid introduction pipe of the lower plate to thereby pass through a space between the lower plate and the gas distributor. To this end, the cooling fluid introduction through-hole and the cooling fluid discharge through-hole are connected to each other by the micro-channel in a lower surface of the lower heat exchanger. In this case, a portion of the cooling fluid coming from the cooling fluid introduction pipe may linearly move in a direction of a space formed by each of the through-holes formed in the lower heat exchanger, the lower gas distributor, the catalyst part, the upper gas distributor, and the upper heat exchanger and corresponding to the cooling fluid introduction pipe, and a remaining portion of the cooling fluid may move through the micro-channel of the lower heat exchanger and then linearly move in a direction of a space formed by each of the through-holes formed in the lower heat exchanger, the lower gas distributor, the catalyst part, the upper gas distributor, and the upper heat exchanger and corresponding to the cooling fluid discharge pipe.

Likewise, the cooling fluid moving through a space between the upper heat exchanger and the upper plate may move through a path similar to the above-mentioned path.

That is, the cooling fluid introduction through-hole and the cooling fluid discharge through-hole are connected to each other through the micro-channel in an upper surface of the upper heat exchanger, the cooling fluid moving from the cooling fluid introduction through-hole of the upper heat exchanger passes through the micro-channel to thereby be combined with the cooling fluid moving toward the cooling fluid discharge through-hole in a vertical direction (linearly moving in a direction of a space formed by each of the through-holes formed in the lower heat exchanger, the lower gas distributor, the catalyst part, the upper gas distributor, and the upper heat exchanger and corresponding to the cooling fluid discharging pipe), and is then discharged to the cooling fluid discharge pipe of the upper plate.

Describing the flow of the reactant and the product according to the present invention, the synthetic gas is introduced into the reactant introduction pipe of the upper plate, passes through the through-hole of the upper heat exchanger corresponding to the reactant introduction pipe, is introduced into the through-hole of the gas distributor corresponding to the reactant introduction pipe, is introduced into the porous-channel through the connection pipe connected to the porous-channel included in the gas distributor, passes through the porous-channel, and is then subjected to methanation reaction in the porous nickel plate. The product including natural gas obtained through the above-mentioned process passes through the lower gas distributor, is discharged to the though-hole of the lower gas distributor corresponding to the product discharge pipe through the connection pipe included in the lower gas distributor, passes through the through-hole of the heat exchanger corresponding to the product discharge pipe, and is then discharged to the product discharge pipe of the lower plate.

Generally, in the case of using a nickel separation layer, it is preferable that there is no difference in temperature between upper and lower portions of the nickel separation layer. Therefore, the reactor does not generally need a separate heat in the methanation process. However, in order to introduce additional reaction or raise or lower a temperature according to a reaction condition of the methanation reaction, a combustor or a cooler may also be separately installed at a front or rear end of the reactor.

A conversion rate and a selectivity of methane, which is a product, may be changed according to a preferable reaction condition such as a temperature and a pressure within the reactor, a stay condition of the reaction gas, or the like.

A reaction temperature may preferably be 200 to 400° C., more preferably, 220 to 380° C., and most preferably, 240 to 360° C.

Meanwhile, according to the present invention, a stay time may be preferably 0.1 to 1000 msec, more preferably 0.5 to 500 msec, and most preferably, 1 to 200 msec.

In addition, according to the present invention, the heat exchanger, the gas distributor, and catalyst part are stacked in plural in series with each other within a single reactor or each of a plurality of reactors are connected in parallel with each other, making it possible to efficiently enhance the methanation reaction.

Hereinafter, Examples will be provided in order to describe the present invention in more detail. However, the present invention is not limited to Examples below.

Example

Production of Porous Nickel Plate Catalyst

A porous nickel separation layer catalyst was produced through a method similar to a method described in Journal of Membrane Science 339 (2009) pp 189-194. Hereinafter, a process of producing the porous nickel separation layer catalyst will be described in detail. A spherical nickel powder having an average particle size of 3 μm and purity of 99.7% available from Sigma-Aldrich Co, was used as a catalyst raw material. In addition, in order to improve thermal stability of the catalyst, the nickel powder was processed in an aluminum nitrate aqueous solution to thereby produce a nickel powder coated with alumina.

In the above-mentioned alumina processing, a dried nickel powder was introduced in the aluminum nitrate aqueous solution and was then fired at a temperature of 450° C. to thereby produce the nickel powder containing 0.1 wt % of alumina.

The nickel powder coated with 4 g of alumina was introduced in a 25.4 mm of metal cylinder mold without using a binder, and was then compressed by a press at a pressure of 140 MPa to thereby produce a porous nickel powder. The press maintains a pressure at a preset pressure value for 10 seconds, thereby making it possible to produce the porous nickel powder.

The porous nickel powder obtained through the compression by the press was processed at a temperature of 900° C. for 2 hours under hydrogen atmosphere, such that it may be used for a methanation reaction according to the present invention. The finally obtained porous nickel powder is shown in FIG. 1. The porous nickel powder has a radius of 25.0 mm and a thickness of 1.6 mm. A structure of the porous nickel powder may be appreciated by a scanning electron microscope (SEM)/energy-dispersive X-ray spectroscopy (EDX).

<Manufacture of Reactor>

Each frame of the upper and lower plates, a heat exchanger, and a gas distributor was manufactured using stainless steel and included a reactant introduction through-hole, a product discharge through-hole, a cooling fluid introduction through-hole, and a cooling fluid discharge through-hole, a stainless steel frame of a catalyst part was manufactured as a frame having only a cooling fluid introduction through-hole and a cooling fluid discharge through-hole, and a micro-channel of the heat exchanger was manufactured through an etching process.

The porous nickel plate obtained by the above-mentioned producing method was attached to the stainless steel frame of the catalyst part.

The upper and lower plates, a pair of upper and lower heat exchangers, a pair of upper and lower gas distributors, and the porous nickel plate catalyst part, which are the four components, were sequentially stacked and then coupled to each other. Here, each plate may be bonded to each other through brazing-bonding or bolt-connection. According to the present invention, each plate was bonded to each other though the bolt connection.

<Methanation Reaction>

Examples 1 to 12

Figure 2:
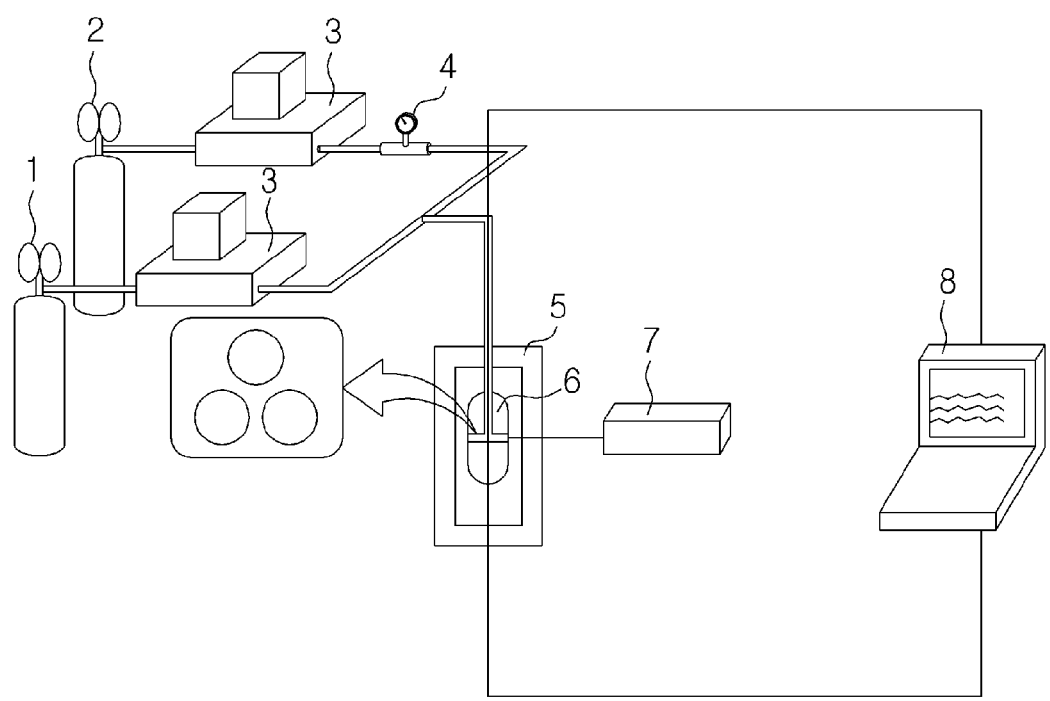
FIG. 2 is a view showing a reaction system in which a micro-channel reactor according to the present invention is used for methanation reaction.

Reaction was Performed Only Using a Porous Nickel Plate without a Heat Exchanger Methanation reaction was performed through a system configured as shown in FIG. 2.

A gas flow controller (MFC) 3 was configured so that molar ratios of hydrogen and carbon monoxide may be controlled, thereby controlling the molar ratios of hydrogen and carbon monoxide to be 3.0. Then, the methanation reaction was performed in the reactor 5 including the heat exchanger, the gas distributor, and the porous nickel plate catalyst part under reaction conditions shown in Table 1.

A flow of a reactant was controlled by an MFC (Brooks 5850 series), and a product was analyzed by gas chromatography (GC, Agilent 6890N) in which HP-MOLSIV and HAYESEP D columns, thermal conductivity detectors (TCD) were mounted.

A water cooling cooler 7 was mounted in a distal end of the reactor 5 in order to analyze the product, and a heat and a K-type thermocouple 6 were mounted in both distal ends of the reactor 5, thereby controlling a reaction temperature while monitoring the reaction temperature by a control and monitoring device 8.

A pressure is controlled by a digital pressure controller mounted in a distal end of the water cooling cooler.

A selectivity of the methanation reaction was defined by the following General Formula 1.

$$S(CH_4) = \frac{V(CH_4)}{V(CO)_{in} - V(CO)_{out}} \qquad [\text{General Formula 1}]$$

A yield and a selectivity of the methanation reaction performed under reaction conditions of Examples 1 to 12 were shown in Table 1 below.

TABLE 1

| NO | STAY TIME (msec) | TEMPERATURE (° C.) | PRESSURE bar | CO CONVERSION RATE (%) | SELECTIVITY (S) | DIFFERENCE IN TEMPERATURE BETWEEN UPPER AND LOWER PORTIONS (° C.) |
|---|---|---|---|---|---|---|
| 1 | 188 | 250 | 1.4 | 3 | 48 | 1 |
| 2 | 188 | 275 | 1.4 | 10 | 64 | 2 |
| 3 | 188 | 300 | 1.4 | 21 | 95 | 2 |
| 4 | 188 | 325 | 1.4 | 46 | 100 | 4 |
| 5 | 188 | 350 | 1.4 | 98 | 88 | 8 |
| 6 | 94 | 350 | 1.5 | 97 | 86 | 13 |
| 7 | 47 | 350 | 1.7 | 97 | 91 | 20 |
| 8 | 188 | 350 | 1.4 | 97 | 83 | 8 |
| 9 | 94 | 350 | 2.1 | 98 | 91 | 14 |
| 10 | 94 | 350 | 2.8 | 99 | 96 | 15 |
| 11 | 37 | 350 | 1.8 | 96 | 92 | 17 |
| 12 | 33 | 350 | 1.9 | 94 | 91 | 14 |

Hereinafter, it may be appreciated that in the case of using the porous nickel separation layer according to the present invention, a difference in temperature between upper and lower portions of the reactor was about 20° C. in a CO conversion rate of 97% or more and a methane selectivity of 90% or more under the reaction condition of Examples 1 to 12. Therefore, in the case of using the porous nickel plate according to the present invention for the methanation reaction, reaction heat is easily controlled, thereby making it possible to minimize an increase in temperature within the reactor.

Comparative Example

Methanation reaction was performed under gas hourly space velocity (GHSV) reaction conditions disclosed in J. Kopyscinski, et al. Production of Synthetic Natural Gas (SNG) from Coal and Dry Biomass-A Technology Review from 1950 to 2009, Fuel 89 (2010) 1763-1783. In this case, a difference in temperature between upper and lower portions of the reactor was 150 to 300° C.

Examples 13 to 24

Reaction was Performed Using a Porous Nickel Plate, a Heat Exchanger, and a Gas Distributor A reactor including upper and lower plates, a porous nickel layer, a heat exchanger, and a gas distributor was introduced into a reaction system of FIG. 2 and methanation reaction was then performed under the same reaction condition as the reaction conditions according to Examples 1 to 12. In this case, a CO conversion rate (%) and a selectivity (S) were the same as those of the previous case and a difference in temperature within the reaction was barely generated.

Example 25

Catalyst Durability Test at the Time of Continuous Use of Reactor Catalyst

Figure 3A:
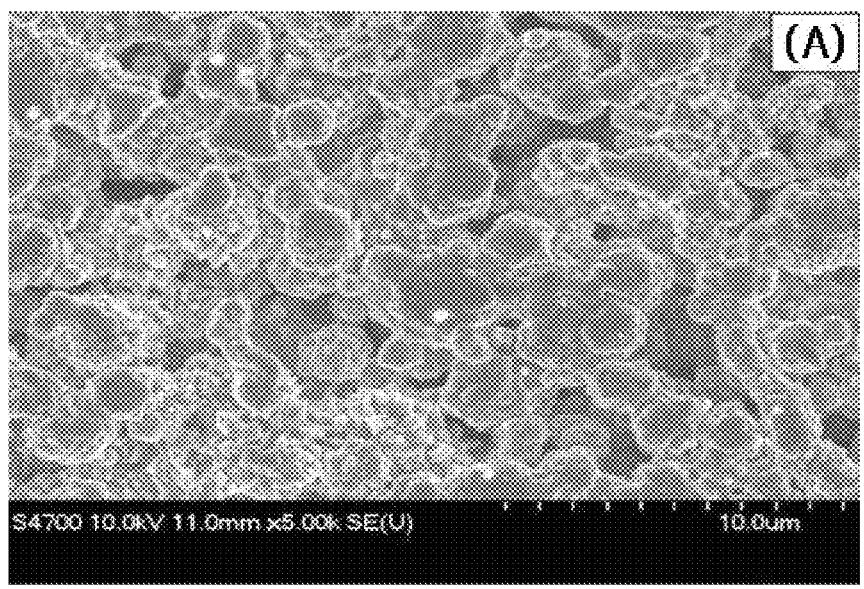
FIG. 3A and FIG. 3B are, respectively, a scanning electron microscope (SEM) photograph and a graph of an energy-dispersive X-ray spectroscopy (EDX) analysis, after reaction under a condition of Example 10.
Figure 3B:
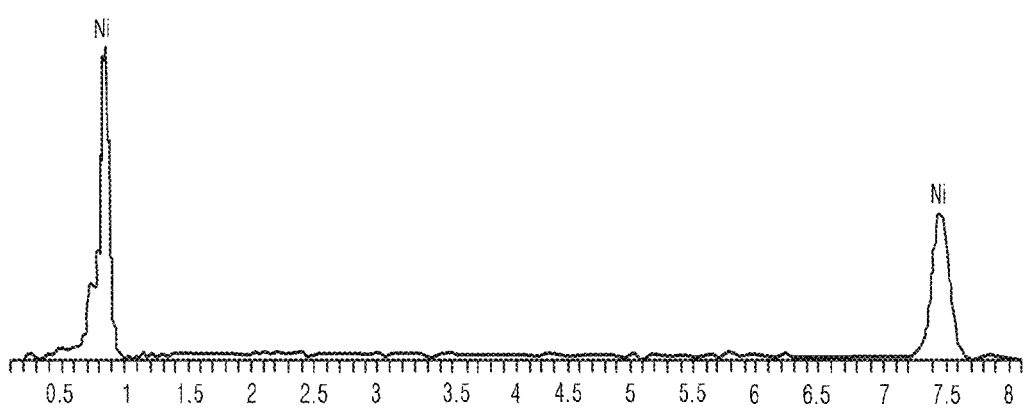

Reaction was performed for 25 hours under conditions according to Example 10. The durability test result showed that carbon was not generated after 25 hours reaction. A scanning electron microscope (SEM) photograph FIG. 3A showed no carbon particles and an energy-dispersive X-ray spectroscopy (EDX) analysis FIG. 3B showed that only NI was detected.

The invention claimed is:

1. A micro-channel reactor for producing synthetic natural gas containing methane gas from synthetic gas, the micro-channel reactor comprising:
an upper plate including a reactant introduction pipe and a cooling fluid discharge pipe formed at different positions on an upper surface thereof, the reactant introduction pipe introducing synthetic gas containing hydrogen and carbon monoxide therethrough;
a lower plate including a cooling fluid introduction pipe and a product discharge pipe formed at different positions on a lower surface thereof, the product discharge pipe discharging a product containing methane gas produced after reaction;
an upper heat exchanger disposed under the upper plate and including a reactant introduction through-hole, a cooling fluid introduction through-hole and a cooling fluid discharge through-hole, which are formed at positions corresponding to the reactant introduction pipe, the cooling fluid introduction pipe and the cooling fluid discharge pipe, respectively, the cooling fluid introduction through-hole being fluid-communicated with the cooling fluid discharge through-hole;
a lower heat exchanger disposed on the lower plate and including a product discharge through-hole, a cooling fluid introduction through-hole and a cooling fluid discharge through-hole, which are formed at positions corresponding to the product discharge pipe, the cooling fluid introduction pipe and the cooling fluid discharge pipe, respectively, the cooling fluid introduction through-hole being fluid-communicated with the cooling fluid discharge through-hole;
an upper gas distributor disposed under the upper heat exchanger and including a reactant introduction through-hole, a cooling fluid introduction through-hole and a cooling fluid discharge through-hole, which are formed at positions corresponding to the reactant introduction pipe, the cooling fluid introduction pipe and the cooling fluid discharge pipe, respectively, the upper gas distributor including a first porous channel fluid-communicated with the reactant introduction through-hole;
a lower gas distributor disposed on the lower heat exchanger and including a product discharge through-hole, a cooling fluid introduction through-hole and a cooling fluid discharge through-hole, which are formed at positions corresponding to the product discharge pipe, the cooling fluid introduction pipe and the cooling fluid discharge pipe, respectively, the lower gas distributor including a second porous channel fluid-communicated with the product discharge through-hole; and
a porous nickel plate catalyst part disposed between the upper and lower gas distributors and including a cooling fluid discharge through-hole and a cooling fluid introduction through-hole, which are formed at positions corresponding to the cooling fluid discharge pipe and the cooling fluid introduction pipe, respectively, the porous nickel plate catalyst part including a porous nickel plate being fluid-communicated with the first porous channel and the second porous channel,
wherein the upper plate, the upper heat exchanger, the upper gas distributor, the porous nickel plate catalyst part, the lower gas distributor, the lower heat exchanger and the lower plate are stacked in the described order; and
wherein the first porous channel or the second porous channel has a three-dimensional (3D) channel, and the 3D channel has a mesh and lattice structure.

2. The micro-channel reactor of claim 1, wherein the upper heat exchanger includes a micro-channel, through which the cooling fluid introduction through-hole is fluid-communicated with the cooling fluid discharge through-hole; and
the lower heat exchanger includes a micro-channel, through which the cooling fluid introduction through-hole is fluid-communicated with the cooling fluid discharge through-hole.

3. The micro-channel reactor of claim 1, wherein the porous nickel plate is produced by compressing a nickel powder and the nickel powder has an average particle size of 0.1 to 50 μm.

4. The micro-channel reactor of claim 1, wherein the porous nickel plate is produced by coating ceramics on the surface of nickel powder particles, or mixing ceramics with the nickel powder particles.

5. The micro-channel reactor of claim 4, wherein the ceramic is selected from a metal oxide containing at least one or two metals selected from the group consisting of Al, Si, Ti, V, Zr, and Ce.

6. The micro-channel reactor of claim 5, wherein the ceramic is 0.1 to 3.0 wt % based on the nickel powder particles.

7. The micro-channel reactor of claim 1, further comprising a combustor or a cooler provided in a front or rear end of the micro-channel reactor.

8. The micro-channel reactor of claim 1, wherein the porous nickel plate is used as a methanation reaction catalyst.

* * * * *